Oct. 31, 1944.   W. H. FRANK   2,361,537
CONTINUOUS OUTLET CONSTRUCTION
Filed Oct. 30, 1943
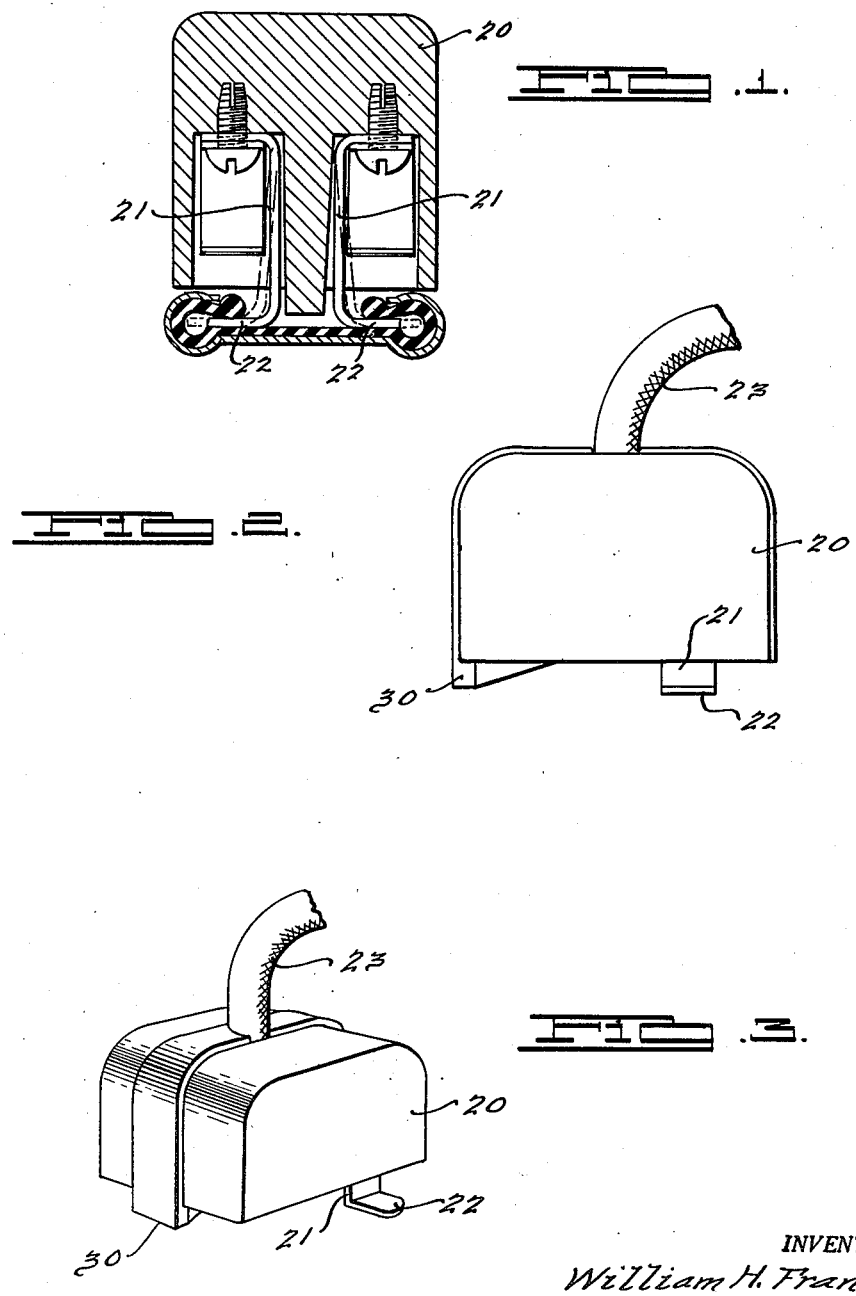
INVENTOR.
William H. Frank.
BY
ATTORNEY.

Patented Oct. 31, 1944

2,361,537

UNITED STATES PATENT OFFICE 2,361,537

CONTINUOUS OUTLET CONSTRUCTION

William H. Frank, Detroit, Mich., assignor to Bulldog Electric Products Company, Detroit, Mich., a corporation of West Virginia Application October 30, 1943, Serial No. 508,439

1 Claim. (Cl. 173—334.1)

This application relates to continuous outlet constructions.

In a prior patent to William H. Frank, No. 2,170,300 of August 22, 1939, there is shown a slotted C shaped continuous outlet strip containing parallel bus bars at its folds, with a slot between, but remote from, the bus bars for receiving oppositely projecting prongs of a twistout type connector.

In this application there is disclosed, for use with a strip of the character shown in that patent, a connector having an indexing lug at one end and connector prongs at the other end. The lug fits into the strip slot when the connector is properly in place and thus operates to index the connector accurately to the strip, so that the prongs properly make contact with the bus bars. The indexing lug also operates to maintain the connector in place against accidental displacement or lateral shifting, since it must be lifted out of the slot before the connector can be turned laterally.

Since the indexing lug snaps into its place in the strip slot when the connector is turned into its proper place, the installer of such a connector can definitely and positively determine the proper insertion of the connector into the strip.

For an understanding of the connector herein disclosed, reference should be had to the appended drawing.

In the drawing,

Fig. 1 shows, in cross section view, a strip provided with the connector hereof; the dotted lines show the prongs thereof spread, as when the connector is not mounted in a strip.

Figs. 2 and 3 are additional views of the connector alone, being side elevation and perspective views, respectively.

Referring to the drawing, it will be seen that these show a slotted strip whose C shaped metal casing 10 partially surrounds a C shaped liner 11 whose edges 12 bound the strip slot 14 which is remote from and is between the bus bars 15 disposed within the folds of the casing and liner forming the strip. For use with such a strip the drawing shows a connector having a body 20 at one of whose ends are downwardly projecting resilient prongs 21 terminating in resilient ends 22 adapted to engage the bus bars 15 and connect them electrically, through straps or the like, not shown, within the body of the connector to the terminals of a load conductor 23.

At the end of the connector body opposite the prongs 21, there is formed a downwardly projecting lug 30 of such a size and shape that it will fit quite easily into but will extend completely across the strip slot 14 and thus index the connector to the strip.

It will be understood that when the connector is to be associated with the strip, it is placed at right angles to the strip so that the prongs are within the slot but are alined in a direction parallel to the bus bars. At that time the lug 30 will be well outside of the strip. The connector may then be rotated 90° in either direction so as to register the lug 30 with the strip slot 14 and this will automatically cause the prongs to rotate and engage the bus bars with pressure. Reverse rotation in either direction is employed to disassociate the connector from the strip. In each rotation of the connector it will be necessary for the connector to be lifted slightly from the strip so that the lug 30 may climb over the strip to and from the slot 14. The contacts or prongs 21 in cooperation with the formations of the strip exert a resilient bias toward the strip which opposes the lifting of the connector that is required to lift lug 30 from the slot 14; and the same spring bias tends to maintain lug 30 in the slot when the lug 30 is alined with the slot. The resiliency of the strip, particularly due to its being C shaped, when engaged by the connector body, tends to exert a spring bias on the connector.

It will be observed that the prongs are normally spread, as in the dotted lines of Fig. 1, but are biased towards each other, when fully inserted, by the bus bars 15.

By visual inspection, that is to say, by seeing the lug 30 properly positioned within the strip slot 14, or by manual response or "feel," as by feeling the snapping of the lug 30 into the slot as the connector is rotated, the user can be assured that the connector is properly associated with the slot and that the prongs are located properly for positive engagement with the bus bars.

Now having described the connector herein disclosed, reference should be had to the claim which follows:

In combination with a C shaped continuous outlet strip whose front wall is slotted and which contains parallel bus bars at the folds of the strip, and wherein the slot is between but is remote from the bus bars, a twist-out type connector comprising a body having at one end downwardly directed oppositely projecting L shaped prongs shaped to fit into the strip slot when they are alined therewith, i. e., when the connector is across the strip, the prongs being formed to have their ends engage the bus bars when the connector is thereafter rotated to lie along the strip, and position the prongs across the slot, the body having at its other end a lug shaped to fit into the strip slot to index the connector to the strip and locate the prongs accurately with respect to the slot and the bus bars, the lug projecting downwardly to fit into the slot and extend across it to the slot edges, the resilience of the parts, when coacting, biasing the lug into the slot, the lug riding over the strip from the outside thereof to the slot and from the slot to the outside, during the rotation of the connector on the prongs as a pivotal axis.

WILLIAM H. FRANK.